(12) United States Patent
Yuan

(10) Patent No.: US 11,613,347 B1
(45) Date of Patent: Mar. 28, 2023

(54) LOW COST, HIGH RELIABLE, DOUBLE ENGINED VTOL

(71) Applicant: Defang Yuan, Ottawa (CA)

(72) Inventor: Defang Yuan, Ottawa (CA)

(*) Notice: Subject to any disclaimer, the term of this patent is extended or adjusted under 35 U.S.C. 154(b) by 0 days.

(21) Appl. No.: 17/532,152

(22) Filed: Nov. 22, 2021

(51) Int. Cl.
*B64C 27/08* (2006.01)
*B64C 27/52* (2006.01)
*B64D 35/04* (2006.01)
*B64D 27/08* (2006.01)
*B64C 27/00* (2006.01)

(52) U.S. Cl.
CPC ............ *B64C 27/08* (2013.01); *B64C 27/006* (2013.01); *B64C 27/52* (2013.01); *B64D 27/08* (2013.01); *B64D 35/04* (2013.01)

(58) Field of Classification Search
CPC ....... B64C 27/08; B64C 27/006; B64C 27/52; B64D 27/08; B64D 35/04
See application file for complete search history.

(56) References Cited

U.S. PATENT DOCUMENTS

| | | | | |
|---|---|---|---|---|
| 10,858,092 | B2* | 12/2020 | Nam | B64C 27/08 |
| 11,106,221 | B1* | 8/2021 | Thrun | G05D 1/0858 |
| 11,111,029 | B2* | 9/2021 | Hoisington | B64D 27/20 |
| 11,167,843 | B1* | 11/2021 | Kim | B64C 39/024 |
| 11,511,854 | B2* | 11/2022 | Baity | B64C 27/08 |
| 2007/0034734 | A1* | 2/2007 | Yoeli | B64C 27/20 |
| | | | | 244/12.1 |
| 2020/0108919 | A1* | 4/2020 | Sada | B64C 27/02 |

* cited by examiner

*Primary Examiner* — Brian M O'Hara

(57) ABSTRACT

A VTOL with a redundant propulsion system, the redundant propulsion system comprising two independent groups of rotors, and each group of rotors are driven by an independent engine. When any failure is detected in the first group of rotors or in its connecting parts, the second group of rotors will be accelerated to take over the first group of rotors to supply flying thrust, or vice versa. The VTOL is quiet, low cost, easy to maneuver and highly reliable, and can be used in future personal transportation.

19 Claims, 7 Drawing Sheets

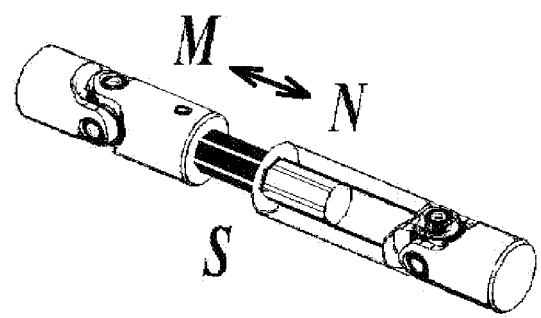
Fig. 9A
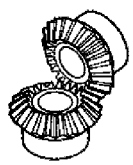
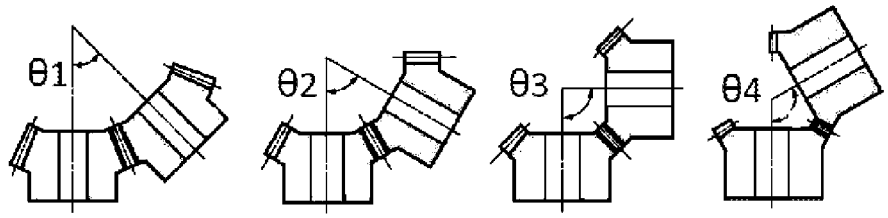
Fig. 9B
Fig. 9C
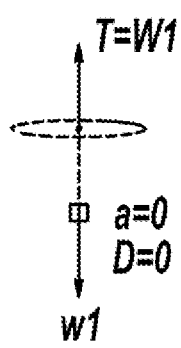
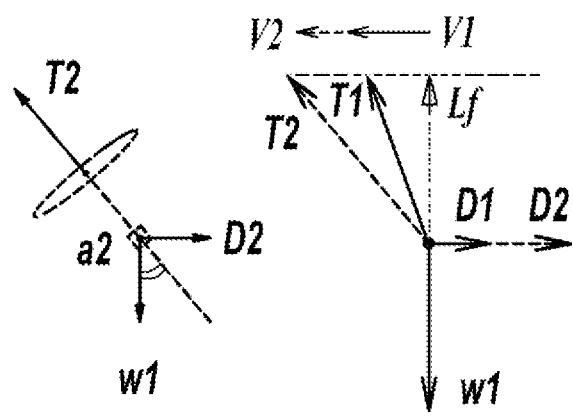
Fig.10A    Fig.10B    Fig.10C    Fig.10D

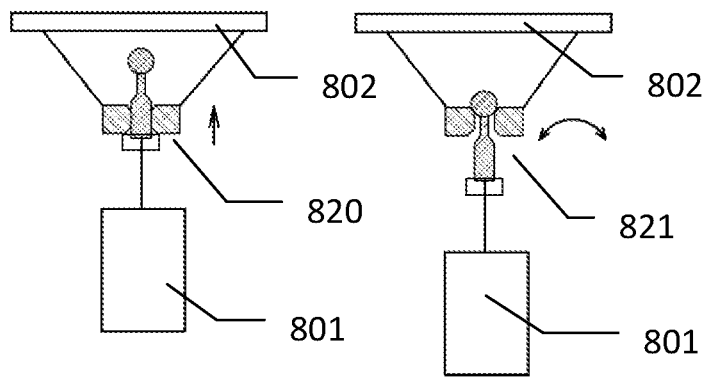
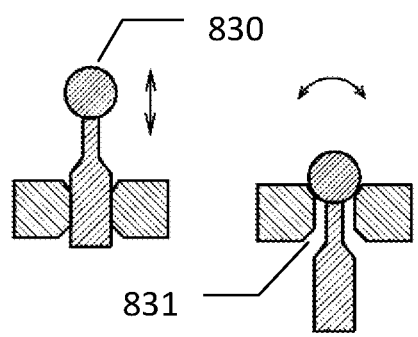
Fig.11A                Fig.11B
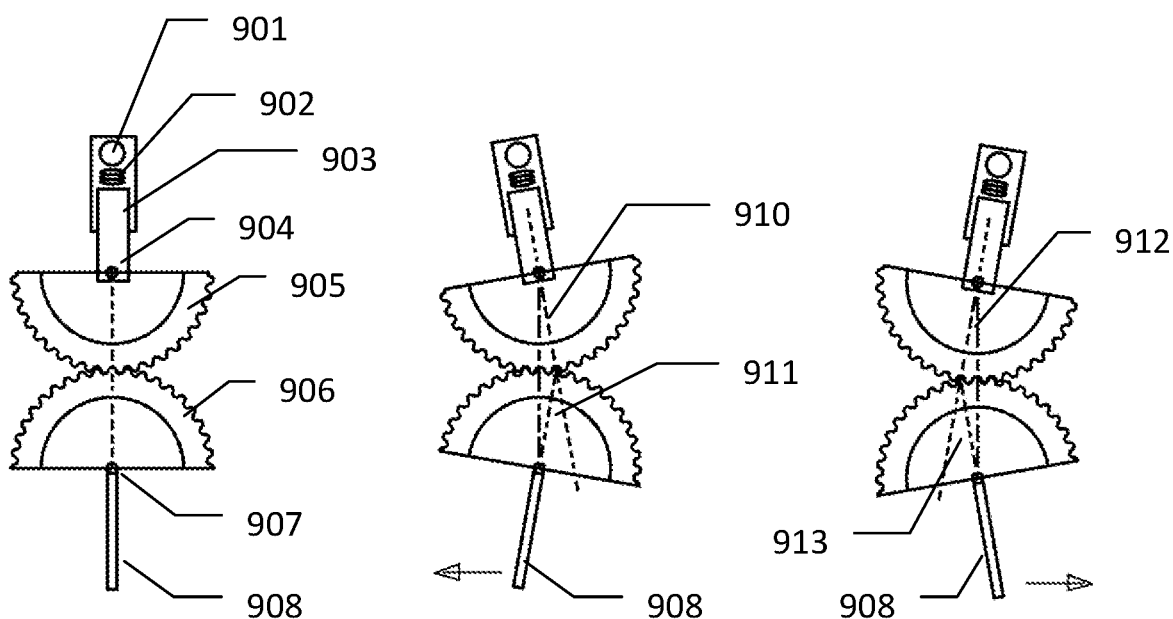
Fig.11C      Fig.11D      Fig.11E

LOW COST, HIGH RELIABLE, DOUBLE ENGINED VTOL

FIELD OF THE INVENTION

The present disclosure relates to VTOL, or vertical take-off and landing vehicle. The reliability of the vehicle is increased by doubled, hot-standby propulsions; the cost is significantly reduced by simplified control systems, the noise is reduced by higher rotor rpm and smaller rotor diameters.

BACKGROUND OF THE INVENTION

Current small VTOLs have two types of propulsion: one is driven by piston engine, and another is drive by electric motors. Both types have substantial disadvantages.

For VTOL type driven by piston engine:
A), the noise is notorious, and it is not suitable for routinely using in residential areas;
B), the costs are high in manufacturing, operation and maintenance;
C), reliability is doubtable, the craft have only one engine, whenever the engine is failed, or the propulsion system is failed, accident is inevitable.

For VTOL type driven by electric motors:
A), the cruise range is short because the heavy batteries, not suitable for trips over 100 km.
B), the costs are high in manufacturing.
C), and it is not suitable for frequently use because long charging time.

The next generation of personal vehicle will be VTOLs, not EVs, because the rapid expansion of cities and traffic jams. A lost cost, high reliable VTOL will be ideal choice.

SUMMARY OF THE INVENTION

In this invention, the chopping noise is reduced by increasing the rpm of the rotors and decreasing the diameter of the rotors.

The reliability is improved by doubled and hot-standby propulsion rotors and power plants.

The maneuver is simplified by controlling or adjusting the angles between the propulsion frame and cockpit frame.

The cost is reduced by employing the low cost, high torque engine in U.S. Ser. Nos. 11/369,216 and 11/131,255.

A redundant propulsion system for small helicopter, comprising:
a first group of rotors with fixed pitch driven by a first engine,
a second group of rotors with fixed pitch driven by a second engine,
the total number of rotors in the first and the second group are at least four,
the first and second group of rotors are mounted on a propulsion frame,
the first and second engines and a cockpit are mounted on a cockpit frame,
the propulsion frame and the cockpit frame are connected by a rotational hinge,
the equivalent center line of the total thrust of the first group of rotors is coincided with the equivalent center line of the total thrust of the second group of rotors, or the equivalent center line of the total thrust of the first group of rotors and the equivalent center line of the total thrust of the second group of rotors are a same line,
the first group of rotors and the first engine can supply minimum safe landing propulsion thrust when the second group of rotors is interrupted,
the second group of rotors and the second engine can supply minimum safe landing propulsion thrust when the first group of rotors is interrupted,
the flight posture of the helicopter is controlled by adjusting the angle between the equivalent center line of the total thrust and the equivalent center line of the gravity of the helicopter.

A VTOL with a redundant propulsion system, comprising:
a first group of rotors which is driven by a first engine,
a second group of rotors which is driven by a second engine,
the total number of rotors in the first group and the second group are at least four,
the first and second groups of rotors are mounted on a propulsion frame,
the first and second engines and a cockpit are mounted on a cockpit frame,
the propulsion frame and the cockpit frame are connected by a rotational hinge,
the equivalent center line of the total thrust of the first group of rotors is coincided with the equivalent center line of the total thrust of the second group of rotors, or the equivalent center line of the total thrust of the first group of rotors and the equivalent center line of the total thrust of the second group of rotors are a same line,
the first group of rotors and the first engine supplies minimum safe flying and landing propulsion thrust when the second group of rotors is interrupted,
the second group of rotors and the second engine supplied minimum safe flying landing propulsion thrust when the first group of rotors is interrupted,
the flight of the VTOL is maneuvered by adjusting the relative angle of the propulsion frame and the cockpit frame, or/and by adjusting the relative distance of the propulsion frame and the cockpit frame.

A VTOL emergency landing system, comprising:
a first group of rotors driven by a first engine,
a second group of rotors driven by a second engine,
the total number of rotors in the first and the second group are at least four,
the first and second group of rotors are mounted on a propulsion frame,
a cockpit and the first and second engine are mounted on a cockpit frame,
the equivalent center line of the total thrust of the first group of rotors is coincided with the equivalent center line of the total thrust of the second group of rotors, or the equivalent center line of the total thrust of the first group of rotors and the equivalent center line of the total thrust of the second group of rotors are same line,
whenever a failure is detected in any parts of the first group of rotors, or in its connected engine, or in its drive shaft and gears, the first engine is intermediately shutoff; the second group of rotors takes over the propulsion thrust control of the VTOL and proceeds emergency landing,
whenever a failure is detected in any parts of the second group of rotors, or in its connected engine, or in its drive shaft and gears, the second engine is intermediately shutoff; the first group of rotors takes over the propulsion thrust control of the VTOL and proceeds emergency landing, the first group of rotors and the first engine can supply least safe landing propulsion thrust when the second group of rotors is interrupted, the second group of rotors and the second engine can supply least safe landing propulsion thrust when the first group of rotors is interrupted.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein:

FIG. 9A is an illustration of slider joint of one of the embodiments in the present invention;

FIG. 9B is an illustration of bevel gears of one of the embodiments in the present invention;

FIG. 9C is an illustration of different bevel gear angles of one of the embodiments in the present invention;

FIG. 10A is an illustration of the force balance of vertical position in the present invention;

FIG. 10B is an illustration of the force balance of forward flying in the present invention;

FIG. 10C is another illustration of the force balance of forward flying in the present invention;

FIG. 10D is an illustration of the vertical lifting forces in the present invention;

FIG. 11A is an illustration of the hinge connecting propulsion and cockpit in one of the embodiments in the present invention;

FIG. 11B is an illustration of the detailed axis connection of the hinge;

FIG. 11C is an illustration of maneuver control gears in one of the embodiments in the present invention;

FIG. 11D is an illustration of maneuver control gears in forward turning in one of the embodiments in the present invention;

FIG. 11E is an illustration of maneuver control gears in backward turning in one of the embodiments in the present invention;

DETAILED DESCRIPTION OF THE INVENTION

It is to be understood that the disclosure is not limited in its application to the details of the embodiments as set forth in the following description. The invention is capable of other embodiments and of being practiced or of being carried out in various ways.

Furthermore, it is to be understood that the terminology used herein is for the purpose of description and should not be regarded as limiting. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more". Any numerical range recited herein is intended to include all values from the lower value to the upper value of that range.

The directions and positions used in the description, such as up, down, vertically, horizontally, left and right, forward, backward and sideways are based on the directions and relative positions shown in the Figures, and are not necessarily the directions and positions in actual real-life applications.

Some symbols or values are sometimes made in italics or bolds for easy reading.

Figure 1:
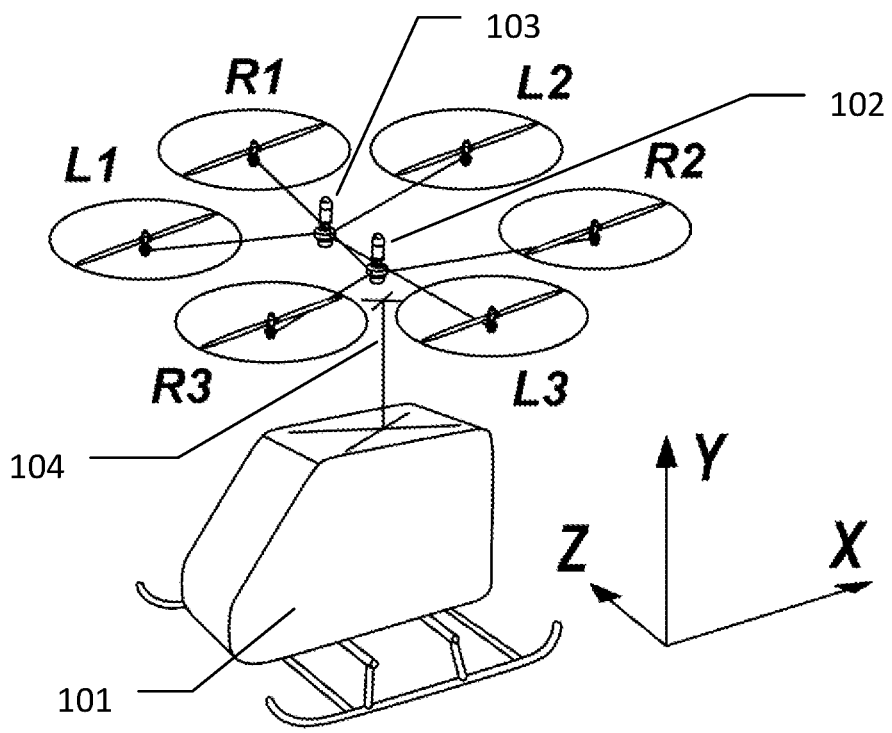
FIG. 1 is an illustration of one of the embodiments of the present invention.

FIG. 1 is an illustration of one of the embodiments in the present invention. It shows the relations of propulsion rotors and the cockpit. Wherein R1, R2, R3 and L1, L2, L3 are two sets of independent rotors, or two groups of rotors (R-group and L-group); 101 is cockpit; 102 is one main gears of the engine pared with rotors R1, R2, R3; 103 is another main gears of the engine pared with rotors L1, L2, L3. And X, Y, Z are reference directions of forward/backward, vertical, and sideways, respectively. The cockpit 101 is lifted by two sets of propulsion systems via hinge 104, wherein the two engines and connections are not shown. "Set of rotors" and "set of propulsion system" are sometimes expressed as "group of rotors" and "group of propulsion system".

Figure 2A:
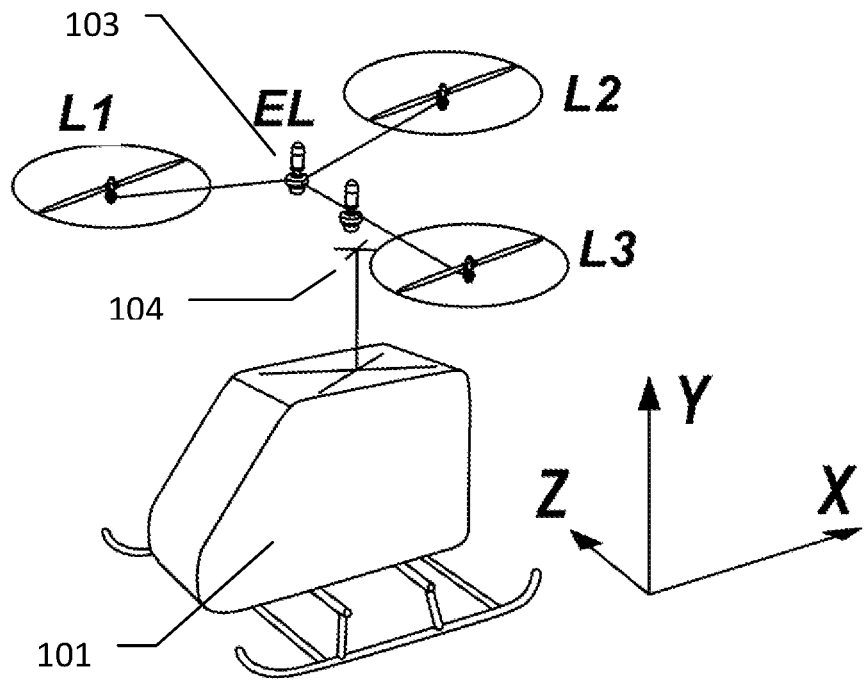
FIG. 2A is an illustration of one of the embodiments of the present invention where only one propulsion system is working.

FIG. 2A is an illustration of one of the embodiments in the present invention. It shows the relations of one set of propulsion rotors or one group of rotors and the cockpit, another group of rotors in not shown to make the illustration clearer. Wherein L1, L2, L3 are one set of independent rotors, 101 is cockpit, 103 is the main gears EL of the engine pared with rotors L1, L2, L3. And X, Y, Z are reference directions of forward, vertical, and sideway, respectively. The cockpit 101 is lifted by only one set of propulsion system via hinge 104; another set of propulsion system is not working and not shown. Wherein the engines and its connecting parts are not shown.

Figure 2B:
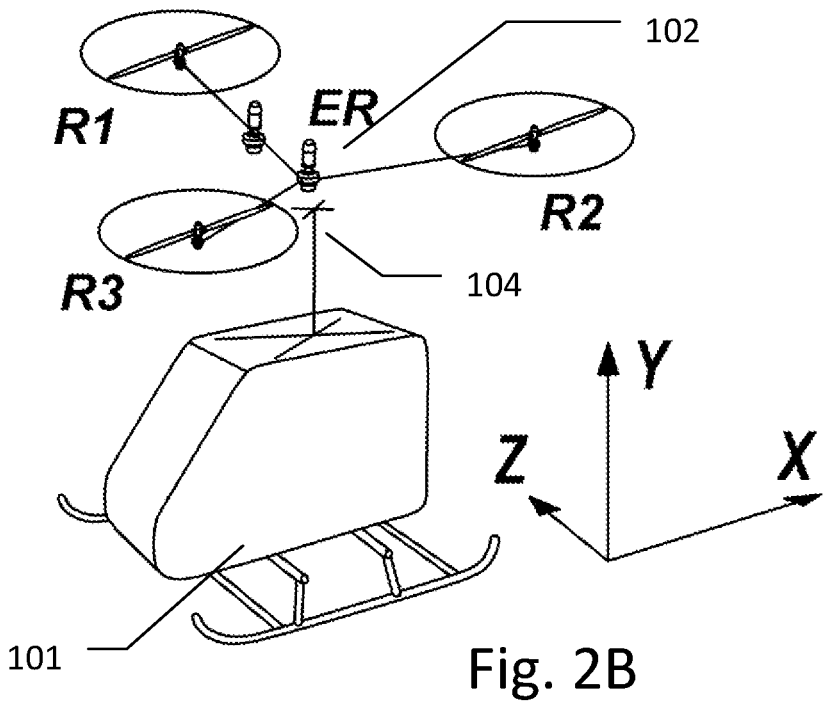
FIG. 2B is an illustration of one of the embodiments of the present invention where only another propulsion system is working.

FIG. 2B is an illustration of one of the embodiments in the present invention. It shows the relations of one set of propulsion rotors and the cockpit. Wherein R1, R2, R3 are one set of independent rotors, 101 is cockpit, 102 is the main gears ER of the engine pared with rotors R1, R2, R3. And X, Y, Z are reference directions of forward, vertical, and sideway, respectively. The cockpit 101 is lifted by only one set of propulsion system via hinge 104; another set of propulsion system is not working and not shown; wherein the engines and its connecting parts are not shown.

Figure 3A:
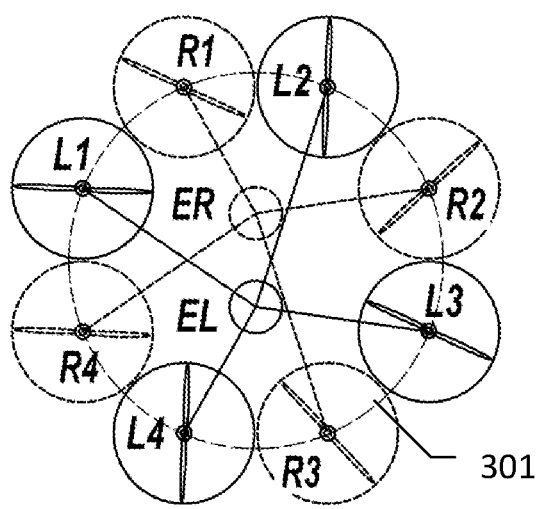
FIG. 3A is an illustration of one configuration of the rotors in the present invention.

FIG. 3A is one configuration of the rotors in the present invention, where the total number of rotors is 8. Where rotors L1, L2, L3, L4 and main gears EL are one set of propulsion system (L-group); Rotors R1, R2, R3, R4 and main gears ER are another set of propulsion system (R-group). Two sets of rotors of the propulsion systems (L's and R's) are symmetrical. The equivalent thrust centers and directions of two sets of propulsion systems are the same in normal operations, or in other words, the equivalent thrust center lines of two sets of propulsion systems are coincident in normal operations. When both set of the rotors and the engines are in normal operations, the equivalent thrust centers and directions (equivalent thrust center lines) of the propulsion keep unchanged in three situations: 1), the L1, L2, L3, L4 are working and R1, R2, R3, R4 are shutdown; 2), the L1, L2, L3, L4 are shutdown and R1, R2, R3, R4 are working; 3), both the L1, L2, L3, L4 and R1, R2, R3, R4 are working. So that when as far as one out of two propulsion systems is normal, minimum thrust can be maintained, and the VTOL can be kept in minimum safe operation such as short flight or safe landing, the fatal accident due to propulsion failure can be prevented. To obtain the similar propulsion thrust force, when both propulsion systems work together the rpm of each set of rotors is lower; when only one propulsion system works alone the rpm of the working set of rotors is higher.

Figure 3B:
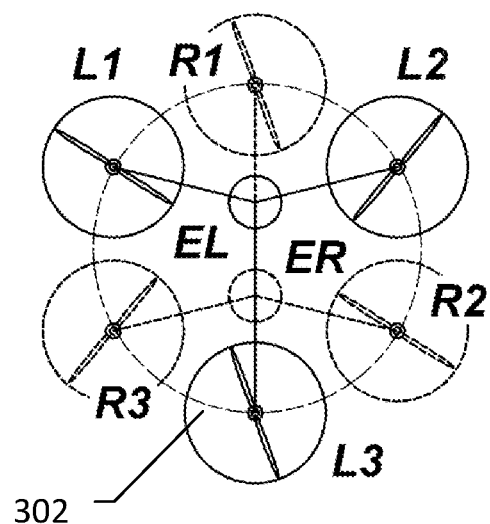
FIG. 3B is an illustration of another configuration of the rotors in the present invention.

FIG. 3B is another configuration of the rotors in the present invention, where the total number of rotors is 6. Where L1, L2, L3 and main gears EL are one set of propulsion system; R1, R2, R3 and main gears ER are another set of propulsion system. Two sets of rotors of the propulsion systems (L's and R's) are symmetrical. The equivalent thrust centers and directions of two sets of propulsion systems are the same in normal operations, or in other words, the equivalent thrust center lines of two sets of propulsion systems are coincident in normal operations. When both set the rotors and the engines are in normal operations, the equivalent thrust centers and directions (the equivalent thrust center lines) of the propulsion keep unchanged in three situations: 1), the L1, L2, L3 are working and R1, R2, R3 are shutdown; 2), the L1, L2, L3 are shutdown and R1, R2, R3 are working; 3), both the L1, L2, L3 and R1, R2, R3 are working. So that when as far as one out of two propulsion systems is normal, the VTOL can maintain its thrust and can be kept in minimum safe operation such as short flight or landing, the fatal accident due to propulsion failure can be prevented. To obtain the similar propulsion thrust force, when both sets of propulsion systems works together the rpm of each set of rotors is lower; when only one propulsion system works alone the rpm of the working set of rotors is higher.

To keep the two sets (or two group) of propulsion systems symmetrical, the rotors can be configured in circles as 301 or 302, and be placed in every other position equally, as in FIG. 3A/3B. And the number of total rotors of two sets can be 4, 6, 8, or any choices as far as the equivalent thrust centers and directions (the equivalent thrust center lines) of two sets of propulsion systems are coincident in normal operations. The main gears EL and ER can be placed in any position within the said circles 301 or 302 as far as the two sets of propulsion systems keep well-balanced.

Figure 4:
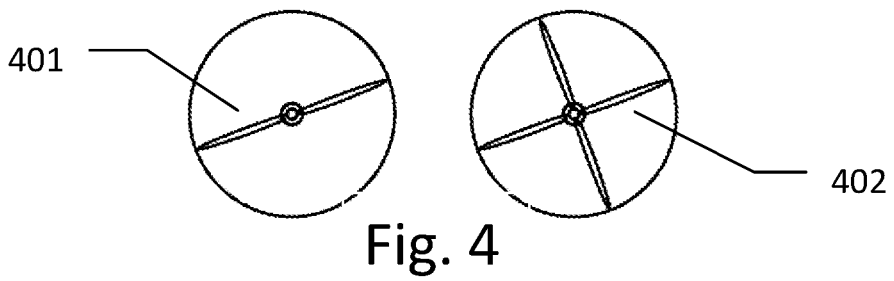
FIG. 4 is an illustration of blade configurations of the rotors in the present invention.

Each rotor can have one pair of blades, two pairs of blades or more. The rotation of blades can be in same or in opposed directions as far as the moment of inertia or gyro effect is well-balanced in the system. As shown in FIG. 4, where rotor 401 has one pair of blades; and 402 has two pairs of blades. In this example, the pitches of the blades are the same and are fixed, or in other words, fixed pitch rotor; so that the control of the thrust is simple and the manufacturing cost keeps low.

Figure 5:
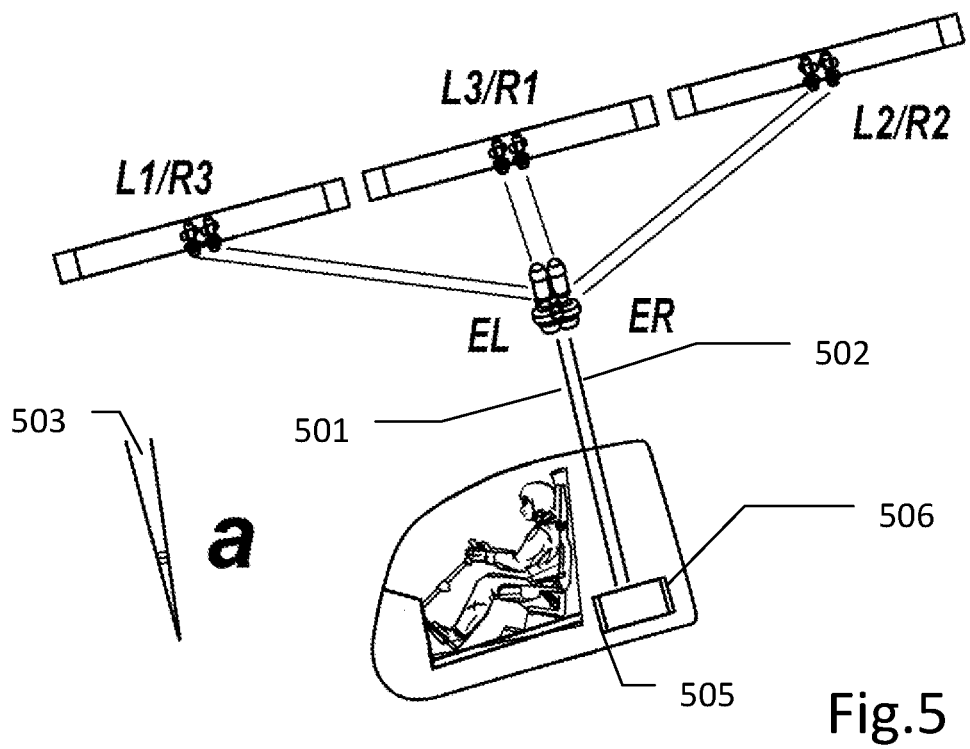
FIG. 5 is an illustration of forward controls of one of the embodiments in the present invention.

FIG. 5 shows the rotors, engines and drive shafts in forward flying (wherein the hinge, the frame supporting the rotors and cockpit are not illustrated). The viewing angle is in mainly Z direction with a small offset to demonstrate the individual part relations.

As shown in FIG. 5, Rotors L1, L2, L3, main gears EL and left engine 505 configure the first set of propulsion system. Left engine (or L-engine) 505 drives the main gears EL via shaft 501, and the main gears EL drives rotors L1, L2 and L3. Rotors R1, R2, R3, main gears ER and right engine 506 configure the second set of propulsion system. Right engine (or R-engine) 506 drives main gears ER via shaft 502, and main gears ER drives rotors R1, R2 and R3. Two sets of propulsion systems are independent systems and can be operated independently.

As shown in 503 of FIG. 5, where a is the angle between the equivalent thrust center line and the equivalent center line of gravity of the VTOL. When a=0, the VTOL is flying at constant speed in horizontal direction; when a>0, the VTOL tends to turn in counter clockwise direction; when a<0, the VTOL tends to turn in clockwise direction. So that forward or backward direction maneuver can be made by controlling the angle a.

Figure 6:
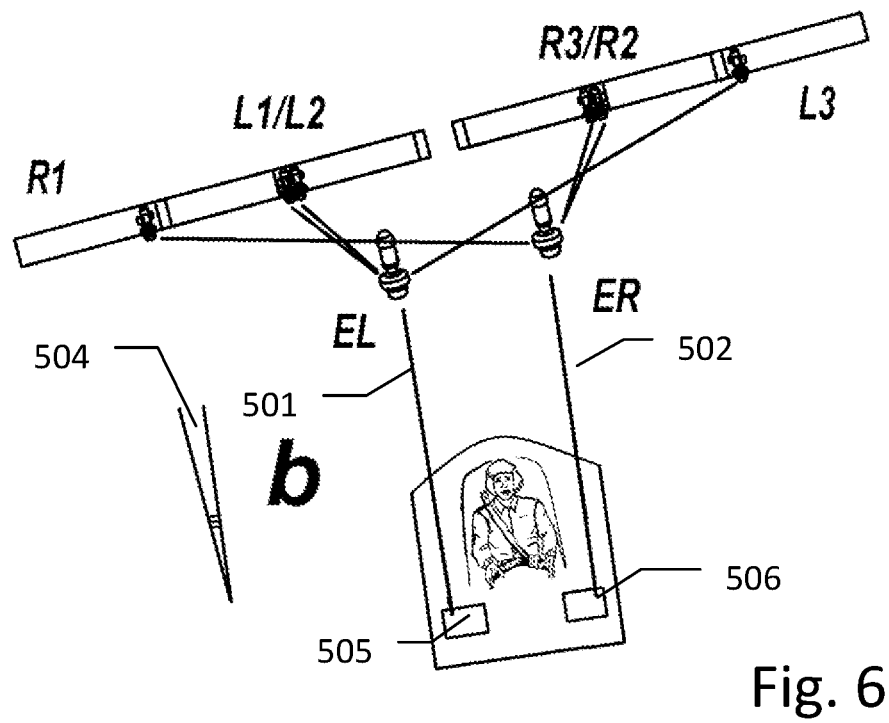
FIG. 6 is an illustration of sideway controls of one of the embodiments in the present invention.

As shown in FIG. 6, Rotors L1, L2, L3, main gears EL and left engine 505 configure the first set of propulsion system. Left engine 504 (or L-engine) drives main gears EL via shaft 501, and main gears EL drives rotors L1, L2 and L3. Rotors R1, R2, R3, main gears ER and right engine (or R-engine) 506 configure the second set of propulsion system. Right engine 506 drives main gears ER via shaft 502, and main gears ER drives rotors R1, R2 and R3. Two sets of propulsion systems are independent systems and can be operated independently.

As shown in 504 of FIG. 6, where b is the angle between the equivalent thrust center line and the equivalent center line of gravity of the VTOL. When b=0, the VTOL is flying at constant speed in horizontal direction; when b>0, the VTOL tends to turn in counter clockwise direction; when b<0, the VTOL tends to turn in clockwise direction. So the side way direction maneuver can be made by controlling the angle b.

The above description can be summarized as: a left engine drives a first main gears via a shaft, the first main gears drives the left group of rotors Ls via a group of shafts, and the left rotors provides the first propulsion thrust. A right engine drives a second main gears via another shaft, the second main gears drives the right group of rotors Rs via another group of shafts, and the right rotors provides the second propulsion thrust. The equivalent thrust centers and directions (or the equivalent thrust center line) of two sets of propulsion systems are coincident in normal operations or kept in the same line. Each propulsion (left or right group propulsion) can provide the minimum thrust to keep the VTOL safe operation or landing. The flight posture of the VTOL can be controlled by adjusting the angles between the equivalent thrust center line and the equivalent center line of gravity of the VTOL in respective directions.

Figure 7:
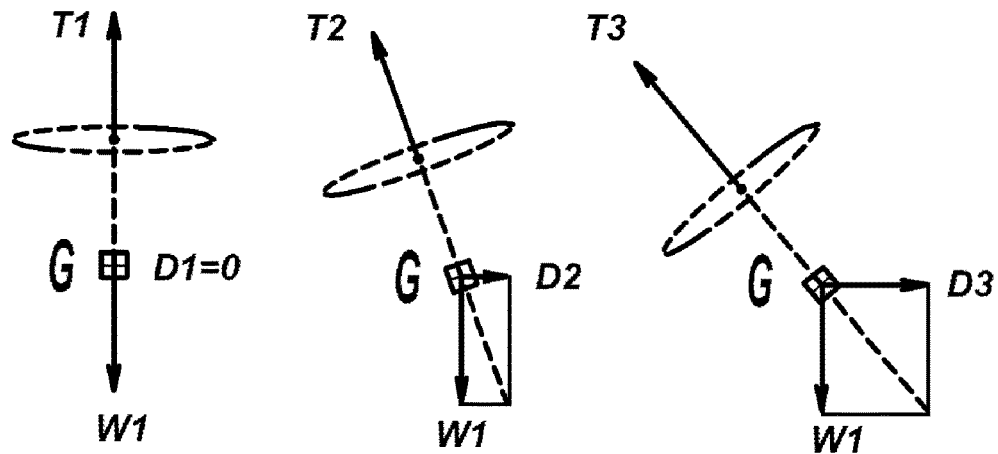
FIG. 7 is an illustration of balanced forces of one of the embodiments in the present invention.

FIG. 7 shows the force balances in constant speeds. Wherein G is the equivalent center of gravity of the VTOL; W1 is the equivalent weight of the VTOL; D1, D2 and D3 are the equivalent drag forces; T1, T2 and T3 are equivalent thrust forces of the VTOL. Whenever the thrust force is balanced with the vector sum of W1 and drag force D, the VTOL is flying at constant speed. For a same VTOL with weight W1, at any given air speed, there is a certain correspondent drag force D, the balance is maintained by correspondent thrust force T, and the thrust force T is further controlled by correspondent engine rotation speed (rpm). T1 is balanced with W1 when D=D1=0; T2 is balanced with W1 and D2 when D=D2>D1; T3 is balanced with W1 and D3 when D=D3>D2. Wherein the thrust T can be provided by a single group of propulsion system (L-group or R-group) or by both groups (combined by L-group and R-group).

Figures 8A, 8B:
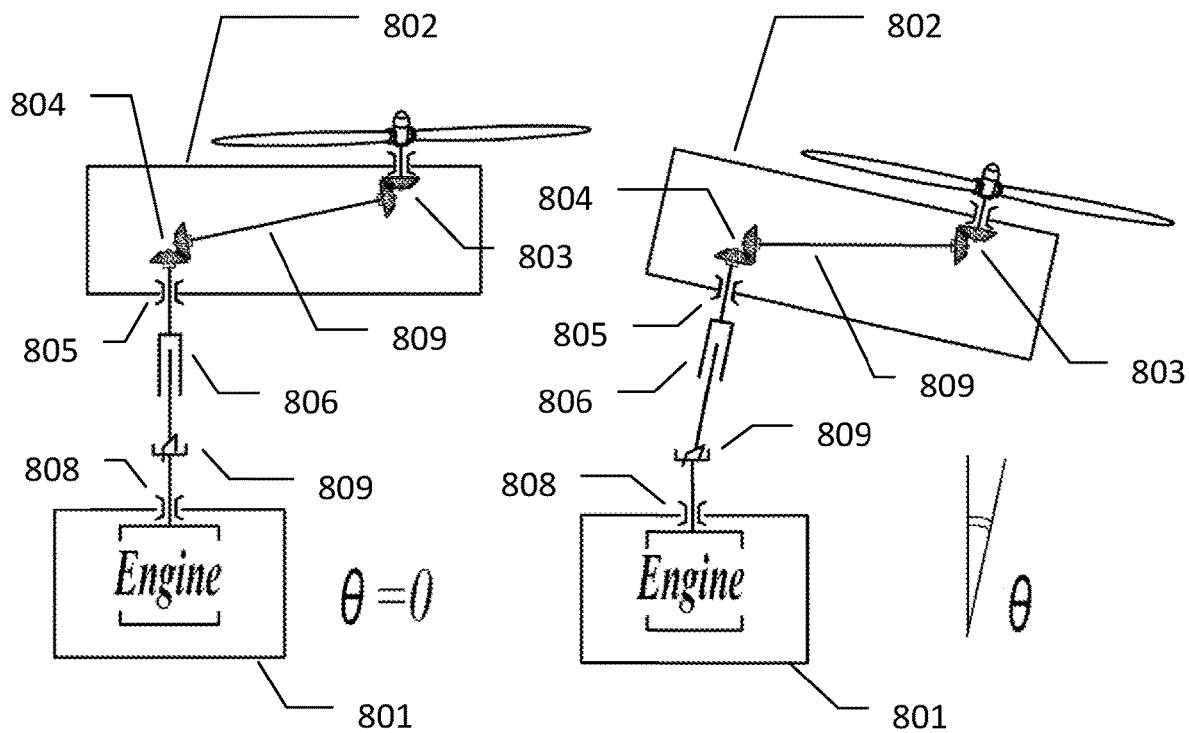
FIG. 8A is an illustration of drive shafts and connections of one of the embodiments in the present invention when the VTOL is in vertical lifting position.
FIG. 8B is an illustration of drive shafts and connections of one of the embodiments in the present invention when the VTOL is in turning.

FIG. 8A shows the driving system of one engine with its paired propulsion rotors. Cockpit frame is 801, the outer ring of a first bearing 808 is fixed to frame 801, at a constant speed universal joint is 809, a slider joint is 806, a second bearing 805 which is fixed to the propulsion frame 802, a main gears 804, 804 is a bevel gears which has one master gear and multiple salve gears, 804 drives multiple rotors grouped with this engine (or one set of grouped rotors), a second bevel gears is 803, 803 and 804 are connected via a shaft 809. Wherein 808, 809, 806 and 805 are connected by their respective shafts. The power (or torque) is transferred from the engine to each of its grouped rotors. When θ=0, the center line of equivalent thrust of the said set of rotors is aligned with the equivalent gravity center line of the VTOL, then 808, 809, 806 and 805 are aligned in one straight line, the VTOL can stay still or fly up and down vertically. Wherein the instantaneous speed of rotors are strictly in proportion to the instantaneous speed of the engine.

FIG. 8B shows the driving system of the engine with its paired propulsion rotors when θ>0. Cockpit frame is 801, the outer ring of a first bearing 808 is fixed to frame 801, a constant speed universal joint is 809, a slider joint is 806, a second bearing 805 which outer ring is fixed on the propulsion frame 802, a main gears 804, 804 is a bevel gears which has one master gear and multiple slave gears, 804 drives multiple rotors grouped with the engine (or one set of the grouped rotors), the second bevel gears is 803, 803 and 804 are connected via shaft 809. Wherein 808, 809, 806 and 805 are connected by their respective shafts. The power (or torque) is transferred from the engine to its grouped rotors. When θ>0, the center line of equivalent thrust of the said set of rotors is not aligned with the equivalent gravity center line of the VTOL but in two lines with an angle θ, or 808, 809, 806 and 805 are aligned in two straight line with angle θ, then the VTOL can make turning in clockwise direction as shown in the figure (or counter clockwise direction, sideway directions in real applications). Wherein the instantaneous speed of rotors are strictly in proportion to the instantaneous speed of the correspondent engine. And it can be seen that the universal joint 809 is in different working angle in comparison to 809 in FIG. 8A; the slider joint 806 is in different working distance in comparison to 806 in FIG. 8A, the torque or power transferred from the engine to the grouped rotors keeps the same as in FIG. 8A.

There are two engines, two main gears and two groups (two sets) paired rotors in one VTOL, or R-group or R-group. Each one of them is working the same as in FIGS. 8A and 8B. There are multiple shafts, each shaft is connecting its main gears to each rotor, but only one shaft 809 is shown in the figures.

One example of the slider joint 806 is shown in FIG. 9A, where the distance of two shaft parts M and N can be varying while keep torque or speed equally transferred from M to N. Where the S is a sliding core which holds part M and N together in rotational directions but can slide in axis directions.

One example of the bevel gears is shown in FIG. 9B, where two gears can be configured to have any angle from 45°-135°. FIG. 9C is a demonstration where the gears coupling angle θ1=45°, θ1=60°, θ1=90°, θ1=120°. For the said main gears, each of them has one driving gear (master gear) and multiple driven gears (slave gears). Each master gear is driven by one engine, and each salve gear is driving one rotor.

FIG. 10A shows the balanced equivalent thrust T and the equivalent gravity W1. Where the center line of equivalent thrust of the said set of rotors (or two sets of rotors) is aligned with the equivalent gravity center line of the VTOL, a=0, horizontal drag force D=0. The VTOL is stay hovering at still position.

FIG. 10B shows the balanced equivalent thrust T and the equivalent gravity W1. Where the center line of equivalent thrust of the said set of rotors (or two set of rotors) is aligned with the equivalent gravity center line of the VTOL in angle a1>0, horizontal drag force D1>0. The VTOL keeps steady flying posture. Where Vector T1=Vector W1+Vector D1.

FIG. 10C shows the balanced equivalent thrust T and the equivalent gravity W1. Where the center line of equivalent thrust of the said set of rotors (or two set of rotors) is aligned with the equivalent gravity center line of the VTOL in angle a2>a1, horizontal drag force D2>D1. The VTOL keeps steady flying posture. Where Vector T2=Vector W1+Vector D2.

FIG. 10D shows the transient from posture a=a1 to posture a=a2 or from flying speed V1 to V2 in one control example of the present invention, the aligning angle of the center line of equivalent thrust and the equivalent gravity center line of the VTOL is changed from a2 to a1, the VTOL tends to be accelerated and turned in counter clockwise direction. For example, when the vertical lifting force is kept constant, or Lf=W1=T1cos (a1)=T2cos(a2), the VTOL will change from posture a=a1 to a=a2 steadily. Where in the equivalent thrust is T=W1/cos(a), the amplitude of angle a can be obtained from gyroscopes or flight controller, and amplitude of T can be controlled from varying the rpm of the engine(s), and the adjustment of angle a can be obtained by tilting the aligning angle of the center line of equivalent thrust and the equivalent gravity center line. When air speed is increased, as shown as V1 to V2, drag forces is increased from D1 to D2, new balance is reached. It can be seen that the fly control of the VTOL in this example is very simple and more reliable than a traditional helicopter which is usually controlled by adjusting blade pitches and engine speed.

FIG. 11A is an illustration of the hinge of the embodiments in the invention, wherein the frame of cockpit is 801, the frame of the rotors is 802. When the VTOL is being parked, the hinge is shown as 820, the hinge is locked in sideway directions and 802 can be moved up in vertical direction. When the VTOL is in flying, the hinge is shown as 821, the hinge is free in forward, backward and sideway turning directions, and can be moved up in vertical direction together with the propulsion frame 802 and cockpit frame 801.

FIG. 11B is another illustration of the hinge embodiments of the invention. When the hinge is at the position shown as 830, the hinge is locked in sideway directions and can be moved up and down in vertical directions. When the hinge is at the position shown as 831, the hinge is free in forward, backward and sideway directions and can be moved up in vertical direction together with the propulsion frame 802 and cockpit frame 801. Wherein the up and down movement is controlled by the thrust of rotors; the forward, backward and sideway turnings are controlled by a mechanism such as a rope, a pulley system, a gear or a servo system, which is shown in the FIG. 11C-11E.

FIG. 11 C is an example of the maneuver control mechanism. A lower gear is as 906, the rotation center 907 of 906 is fixed on the cockpit frame, the lower gear 906 can be rotated around 907 when control handle 908 is pushed or pulled. A upper gear is as 905, the rotation center of 905 is 904, and 903 is a slider joint, 902 is a tension spring; 901 is the fixed point, the upper gear is fixed at 901 with the propulsion frame in the equivalent propulsion thrust center line, the rotation center 904 can be moved linearly along the equivalent propulsion thrust center line of the propulsion frame, the spring 902 keeps the upper and lower gears engaged firmly in rotation; the upper gear 905 is being rotated around 904 when the lower gear 906 rotates. When no force is applied on the control handle 908, the equivalent propulsion thrust center line of the propulsion frame is aligned with the equivalent gravity center line of the cockpit frame.

FIG. 11 D is an illustration of the maneuver control mechanism when the control handle 908 is pushed forward. The equivalent propulsion thrust center line of the propulsion frame is forced to be aligned in an angle 911 with the equivalent gravity center line of the cockpit frame. The equivalent propulsion thrust center line of the propulsion frame is rotated by an angle 910 from its original position in FIG. 11C. In this situation, the VTOL can move forward and/or turn in counter clockwise direction.

FIG. 11E is an illustration of the maneuver control mechanism when the control handle 908 is pulled backward. The equivalent propulsion thrust center line of the propulsion frame is forced to be aligned in an angle 913 with the equivalent gravity center line of the cockpit frame. The equivalent propulsion thrust center line of the propulsion frame is rotated by an angle 912 from its original position in FIG. 11C. In this situation, the VTOL can move backward and/or turn in clockwise direction.

When two sets of the maneuver control mechanisms are mounted on a VTOL in orthogonal directions (for example, in X and Z directions in FIG. 1), plus the control of the engine speed, the VTOL can be maneuvered in any direction.

Figure 12:
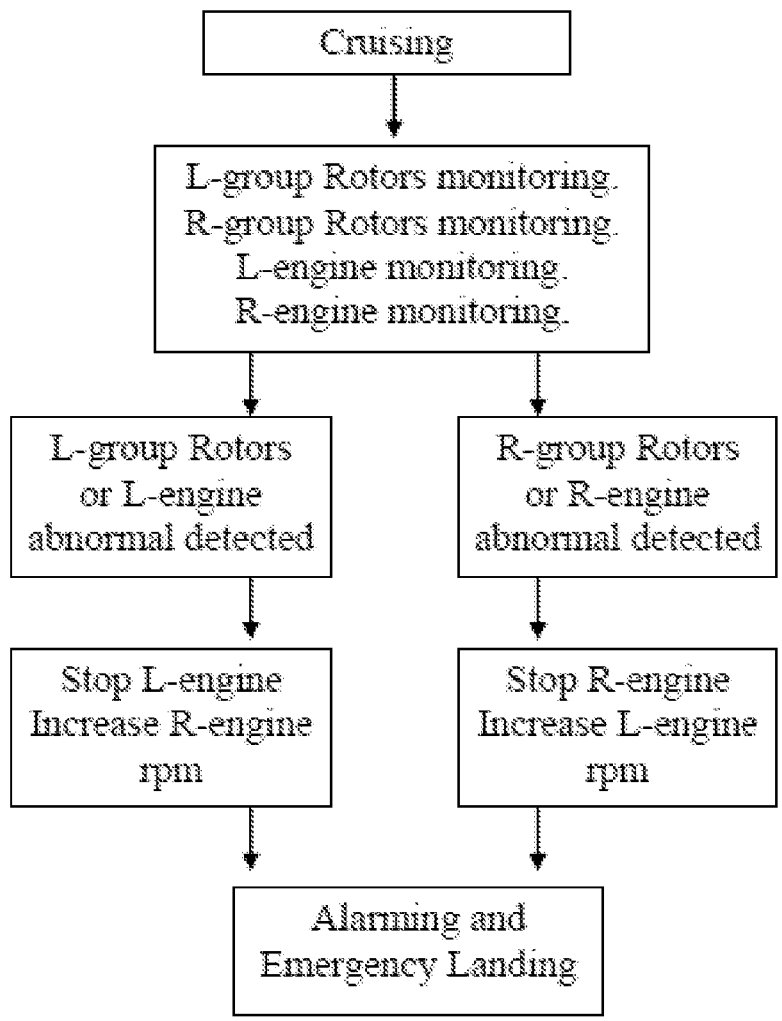
FIG. 12 is an illustration of emergency landing logic when one propulsion system is failed.

Benefited from the high volume efficiency in patent U.S. Ser. Nos. 11/136,916 and 11/131,255, two engines (505 and 506) can be equipped in one VTOL, each engine drives its paired (grouped) rotors. The VTOL can be driven by two engines in normal flight, and if any part in one of the propulsion system is failed, the failed propulsion system can be by-passed or shutoff and the VTOL can be controlled by another propulsion system to maintain a safe short flight or proceeding a safe emergency landing. If the reliability of each propulsion system is 99.99%, and 99.99% is a reasonable prediction in real applications, the combined reliability will be boosted to 99.9999% by two propulsion system combined. Theoretically this double-engined VTOL is as reliable as a commercial flight. One example of the emergency control strategies is shown in FIG. 12.

It is to be mentioned again that the universal joint is constant speed universal joint, which can be a single joint one, or combine by two joints to maintain its constant speed characteristics. A single universal joint with speed-fluctuation is not recommended in this application.

The invention claimed is:

1. A redundant propulsion system for a small helicopter, comprising:
   a first group of rotors with fixed pitch driven by a first engine,
   a second group of rotors with fixed pitch driven by a second engine,
   the total number of rotors in the first and the second group are at least four,
   the first and second group of rotors are mounted on a propulsion frame,
   the first and second engines and a cockpit are mounted on a cockpit frame,
   the propulsion frame and the cockpit frame are connected by a rotational hinge,
   an equivalent center line of the total thrust of the first group of rotors is coincided with an equivalent center line of the total thrust of the second group of rotors, or the equivalent center line of the total thrust of the first group of rotors and the equivalent center line of the total thrust of the second group of rotors are a same line,
   the first group of rotors and the first engine can supply minimum safe landing propulsion thrust when the second group of rotors is interrupted,
   the second group of rotors and the second engine can supply minimum safe landing propulsion thrust when the first group of rotors is interrupted,
   the flight posture of the helicopter is controlled by adjusting the angle between the equivalent center line of the total thrust and the equivalent center line of the gravity of the helicopter.

2. The redundant propulsion system of claim 1:
   wherein the first engine and the second engine are working independently in rotations.

3. The redundant propulsion system of claim 1:
   the first engine is connected to the first group of rotors by a first drive shaft system; the first drive shaft system is further comprising a first universal joint, a first slider joint and at least two bevel gears, the first universal joint is a constant speed universal joint, the second engine is connected to the second group of rotors by a second drive shaft system; the second drive shaft system is further comprising a second universal joint, a second slider joint and at least two bevel gears, the second universal joint is a constant speed universal joint.

4. The redundant propulsion system of claim 3:
   when in referring to the first engine, the positions of the first group of rotors can be adjusted both in angle and distance, the first drive shaft can supply constant drive speed to each rotor of the first group by automatically compensating the first universal joint and/or automatically compensating the first slider joint, when in referring to the second engine, the positions of the second group of rotors can be adjusted both in angle and distance, the second drive shaft can supply constant drive speed to each rotor of the second group by automatically compensating the second universal joint and/or automatically compensating the second slider joint.

5. The redundant propulsion system of claim 1:
   wherein there is one pair of blades in each rotor.

6. The redundant propulsion system of claim 1:
   wherein there are two pairs of blades in each rotor.

7. A VTOL with a redundant propulsion system, comprising:
   a first group of rotors which is driven by a first engine,
   a second group of rotors which is driven by a second engine,
   the total number of rotors in the first group and the second group are at least four,
   the first and second groups of rotors are mounted on a propulsion frame,
   the first and second engines and a cockpit are mounted on a cockpit frame, the propulsion frame and the cockpit frame are connected by a rotational hinge, an equivalent center line of the total thrust of the first group of rotors is coincided with an equivalent center line of the total thrust of the second group of rotors, or the equivalent center line of the total thrust of the first group of rotors and the equivalent center line of the total thrust of the second group of rotors are a same line, the first group of rotors and the first engine supplies minimum safe flying and landing propulsion thrust when the second group of rotors is interrupted, the second group of rotors and the second engine supplied minimum safe flying and landing propulsion thrust when the first group of rotors is interrupted, flight of the VTOL is maneuvered by adjusting the relative angle of the propulsion frame and the cockpit frame, or/and by adjusting the relative distance of the propulsion frame and the cockpit frame.

8. The VTOL of claim 7:

wherein the first engine and the second engine are supplying torques independently.

9. The VTOL of claim 7:

the first engine is connected to the first group of rotors by a first drive shaft system, the first drive shaft system is further comprising a first universal joint, a first slider joint and at least two gears, the first universal joint is a constant speed universal joint, the second engine is connected to the second group of rotors by a second drive shaft system, the second drive shaft system is further comprising a second universal joint, a second slider joint and at least two gears, the second universal joint is a constant speed universal joint.

10. The VTOL of claim 7, further comprising:

a rotational hinge, the hinge supplies connection between the propulsion frame and the cockpit frame; the thrust of the propulsion frame are transferred to the cockpit frame via the hinge, a maneuver handle, when push or pull the maneuver handle, the angle between the equivalent center line of the total thrust of rotors and the equivalent center line of the total gravity of the VTOL can be adjusted in referring to the hinge as the rotational center of the propulsion frame and the cockpit frame.

11. The VTOL of claim 7:

wherein all the rotors are fixed pitch rotors.

12. A VTOL emergency landing system, comprising:

a first group of rotors driven by a first engine, a second group of rotors driven by a second engine, the total number of rotors in the first and the second group are at least four, the first and second group of rotors are mounted on a propulsion frame, a cockpit and the first and second engine are mounted on a cockpit frame, an equivalent center line of the total thrust of the first group of rotors is coincided with an equivalent center line of the total thrust of the second group of rotors, or the equivalent center line of the total thrust of the first group of rotors and the equivalent center line of the total thrust of the second group of rotors are same line, whenever a failure is detected in any parts of the first group of rotors, or in the first group of rotors connected engine, or in the first group of rotors drive shaft and gears, the first engine is intermediately shutoff; the second group of rotors takes over the propulsion thrust control of the VTOL and proceeds emergency landing, whenever a failure is detected in any parts of the second group of rotors, or in the second group of rotors connected engine, or in the second group of rotors drive shaft and gears, the second engine is intermediately shutoff; the first group of rotors takes over the propulsion thrust control of the VTOL and proceeds emergency landing, the first group of rotors and the first engine can supply least safe landing propulsion thrust when the second group of rotors is interrupted, the second group of rotors and the second engine can supply least safe landing propulsion thrust when the first group of rotors is interrupted.

13. The VTOL of claim 12:

wherein the first engine and the second engine are supplying torques independently.

14. The VTOL of claim 12:

the first engine is connected to the first group of rotors by a first drive shaft system, the first drive shaft system is further comprising a first universal joint, a first slider joint and at least two gears, the first universal joint is a constant speed universal joint, the second engine is connected to the second group of rotors by a second drive shaft system, the second drive shaft system is further comprising a second universal joint, a second slider joint and at least bevel gears, the second universal joint is a constant speed universal joint.

15. The VTOL of claim 12, further comprising a rotational hinge, the hinge supplies connection between the propulsion frame and the cockpit frame, the thrust of the propulsion frame are transferred to the cockpit frame via the hinge, a maneuver handle, when push or pull the maneuver handle, the angle between the equivalent center line of the total thrust of rotors and the equivalent center line of the total gravity of the VTOL can be adjusted in referring to the hinge as the rotational center of the propulsion frame and the cockpit frame.

16. The VTOL of claim 12:

wherein there is one pair of blades in each rotor.

17. The VTOL of claim 12:

wherein there are two pairs of blades in each rotor.

18. The VTOL of claim 12:

wherein all the rotors are fixed pitch rotors.

19. The VTOL of claim 12:

wherein both engines are piston engines.

* * * * *